Figures 5, 5A:
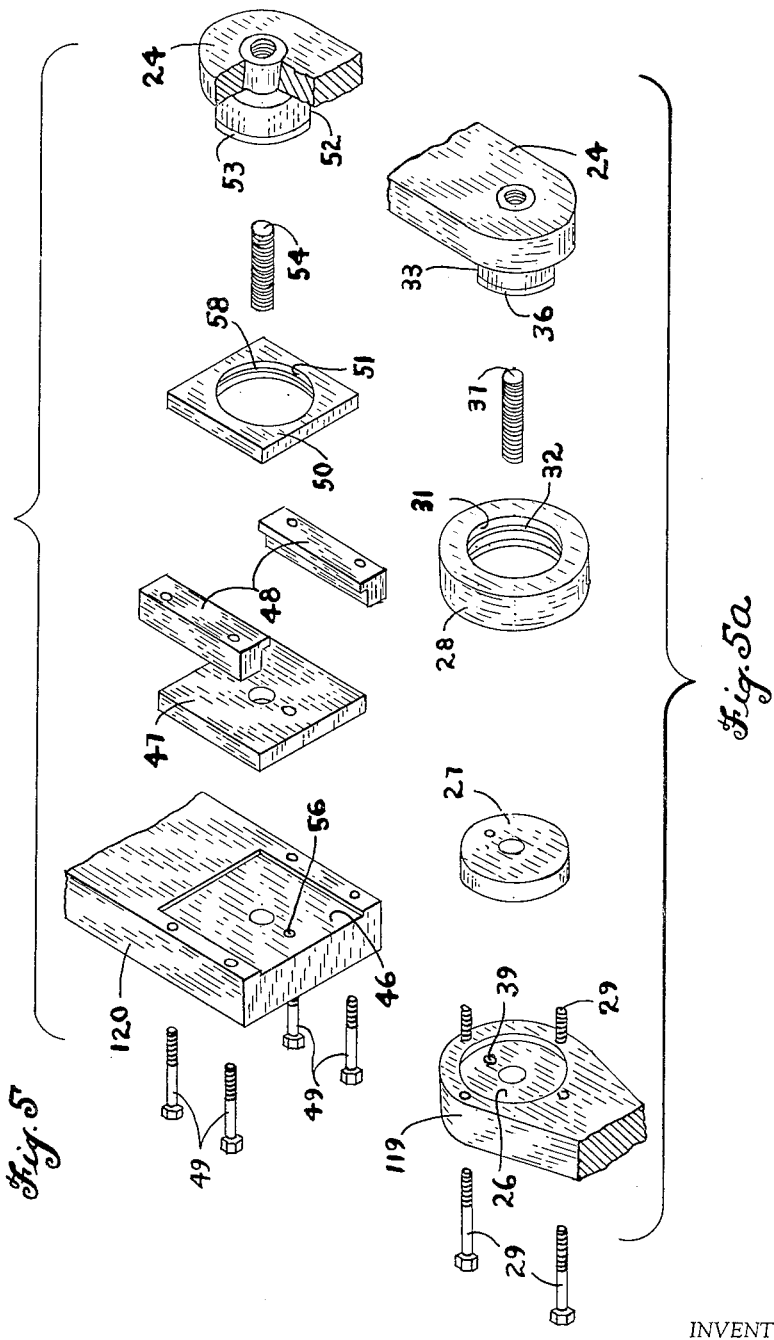

Sept. 5, 1961  J. R. BAREFOOT ET AL  2,999,217
CURRENT TRANSFER DEVICE FOR RELATIVELY MOVABLE MEMBERS
Filed Aug. 8, 1957  3 Sheets-Sheet 1
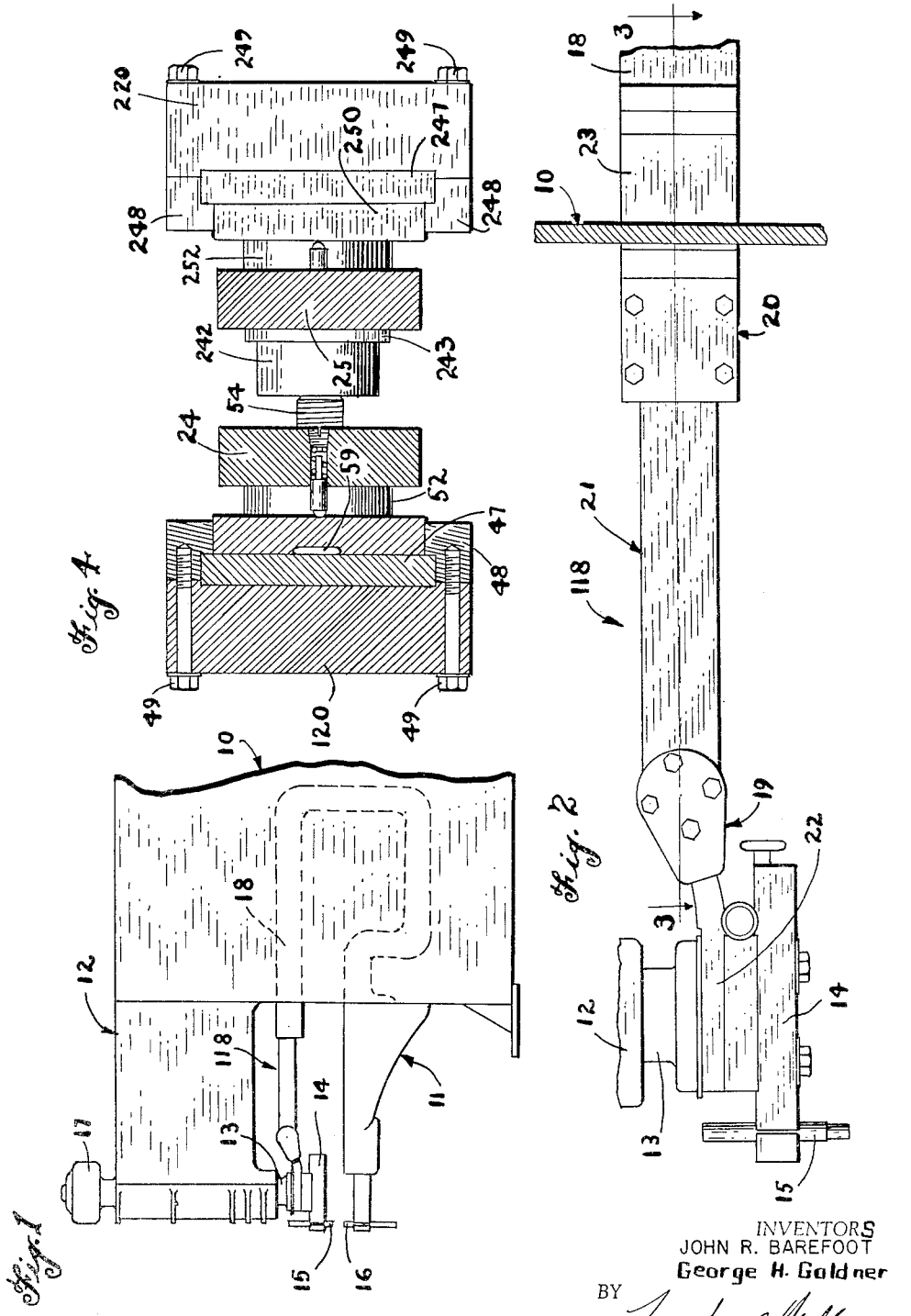
INVENTORS
JOHN R. BAREFOOT
George H. Goldner
BY
Michael Williams
Attorney

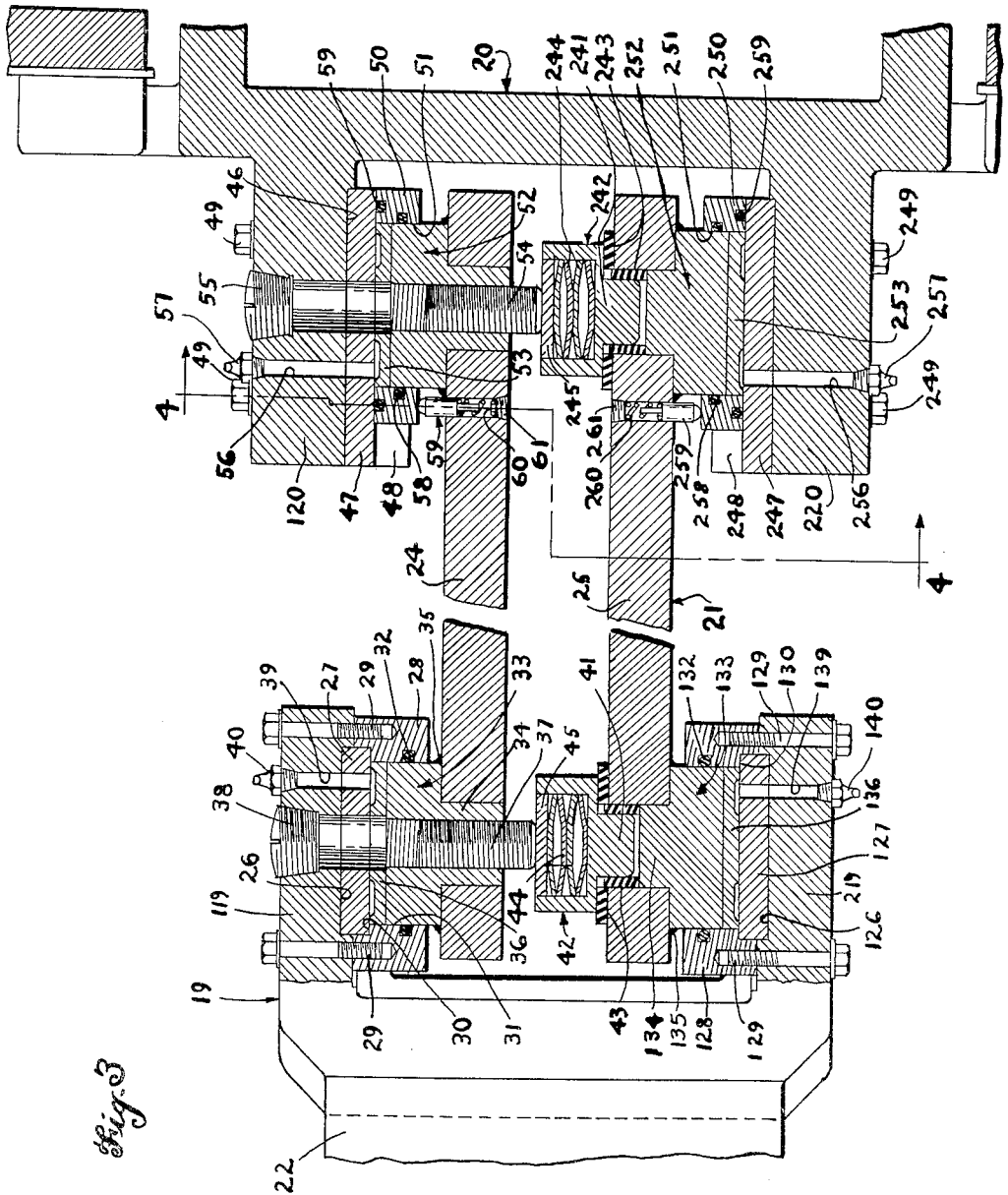

Sept. 5, 1961  J. R. BAREFOOT ET AL  2,999,217
CURRENT TRANSFER DEVICE FOR RELATIVELY MOVABLE MEMBERS
Filed Aug. 8, 1957  3 Sheets-Sheet 3

INVENTORS
JOHN R. BAREFOOT
George H. Goldner
BY
Michael Williams
Attorney

United States Patent Office 2,999,217
Patented Sept. 5, 1961

2,999,217
CURRENT TRANSFER DEVICE FOR RELATIVELY MOVABLE MEMBERS
John R. Barefoot, Youngstown, and George H. Goldner, Warren, Ohio, assignors, by mesne assignments, to The McKay Machine Company, Youngstown, Ohio, a corporation of Ohio
Filed Aug. 8, 1957, Ser. No. 677,025
4 Claims. (Cl. 339—2)

The present invention relates to electrical devices wherein relatively high amperage current must be passed with a minimum of resistance between a pair of relatively movable members, more particularly to electrical devices such as resistance welders and the like, and the principal object of the present invention is to provide new and improved devices of such character.

As is well known, resistance welding devices comprise a welding transformer having secondary windings in which a relatively high amperage welding current is induced by the flow of relatively low amperage, high voltage current in the primary windings of the transformer. Included in series in the secondary circuit are a pair of welding electrodes between which the work to be welded is positioned, one electrode being connected to one lead of the secondary windings and the other being connected to the other lead thereof. Normally, one of these electrodes is fixed while the other is mounted for movement relative thereto so that the work may readily be positioned between the electrodes for welding and readily removed from between the electrodes after welding.

No problem is presented in connecting the fixed electrode to the secondary windings because there is no movement between this electrode and the transformer. However, a problem is presented in connecting the movable electrode to the fixed secondary windings. In the past, the movable electrode was connected to the transformer secondary by means of a flexible cable or the like. This however, has not been entirely satisfactory because, as a result of the large size cable required, it presented considerable resistance to movement of the electrode. Furthermore, because of the mechanical stresses imposed upon the cable as a result of movement of the movable electrode and because of the elevated temperatures at which the cable operated as a result of the heavy current flow therethrough, frequent cable breakage occurred. This, as will be understood, causes expensive interruptions in production.

Attempts have been made to replace the flexible cable with one or more current-carrying bars which extend between the secondary and the movable electrode and which are pivotally connected thereto; however, these constructions were rather crude in that no provision was made for lubricating the pivot connections or for excluding foreign matter therefrom. Accordingly, rapid wear of the pivot connections and frequent parts replacement inevitably occurs.

The present invention provides a connection between the movable electrode of a resistance welder and the secondary windings of the welding transformer which has both low mechanical resistance and high electrical transmission efficiency. The connection further requires little maintenance for long periods of operation under adverse conditions. These and other advantages will readily become apparent from a study of the following description and from the drawings appended hereto.

In the drawings accompanying this specification and forming a part of this application there is shown, for purpose of illustration, an embodiment which the invention may assume, and in these drawings:

FIGURE 1 is a fragmentary side elevational view of spot welding apparatus embodying the present invention, FIGURE 2 is an enlarged fragmentary view of a portion of the apparatus shown in FIGURE 1, FIGURE 3 is a further enlarged, broken sectional view generally corresponding to the line 3—3 of FIGURE 2, FIGURE 4 is a sectional view generally corresponding to the line 4—4 of FIGURE 3, and FIGURES 5 and 5a are exploded perspective views of portions of the construction shown in FIGURE 3.

In FIGURE 1 there is fragmentarily illustrated a conventional spot welder comprising a housing 10 from which project in vertically spaced relation a lower electrode support arm 11 and an upper electrode support arm 12. Slidably carried by upper arm 12 is a slide 13 and secured to the lower end of the slide is an upper electrode holder 14 which carries upper electrode 15. Suitably carried by lower support arm 11 in alignment with upper electrode 15 is a lower electrode 16 and any suitable means, such as a fluid cylinder 17, may be employed to reciprocate slide 13 and consequently upper electrode 15 toward and away from lower electrode 16.

In the position of parts shown, slide 13 is in an elevated position whereby electrodes 15, 16 are separated to provide for insertion therebetween of the material to be welded. During the welding operation, however, cylinder 17 will move slide 13 down so as to clamp the material to be welded between the two electrodes. Following the passage of welding current between the two electrodes and through the material, slide 13 will be elevated once again to the position illustrated to permit removal of the welded material from between the separated electrodes.

The welding current circuit for electrodes 15, 16 comprises the secondary 18 of a transformer, to respective ends of which respective electrodes are electrically connected. As in conventional constructions, lower electrode 16 is connected to one end of the secondary by means of lower arm 11 while upper electrode 15 is connected to the other end of the secondary by connector means 118. The present application is concerned with the novel construction and arrangement of such connector means 118.

As best shown in FIGURE 2, connector means 118 comprises a pair of spaced-apart current conducting members 19 and 20 between which extends an arm assembly 21. Member 19 has a portion 22 which is adapted to be electrically connected to upper electrode holder 14 while member 20 has a portion 23 which is adapted to be electrically connected to one side of the transformer secondary 18.

With reference now to FIGURE 3, the adjoining portions of members 19, 20 provided respective pairs of spaced lugs or abutments. Member 19 has spaced abutments 119, 219 while member 20 has spaced abutments 120, 220. As before mentioned, arm assembly 21 extends between and electrically connects together members 19 and 20 and such means comprises a pair of arms 24, 25 disposed in spaced, side by side relation between the respective abutments provided by members 19, 20. In a manner to be disclosed, arm 24 is pivoted to abutments 119 and 120 while arm 25 is pivoted to abutments 219 and 220.

As shown in FIGURES 3 and 5, abutment 119 is counterbored at 26 to receive a contact member 27. This contact member is held in place against the abutment by means of a ring member 28 secured to the abutment by screws 29 and having an annular shoulder 30 which abuts the contact member. For a purpose to be disclosed, ring member 28 provides an annular wall 31 which defines a circular recess and seated in an annular groove in wall 31 is an O sealing ring 32.

Adapted to be seated in the recess provided by ring member 28 and rotatably carried by annular wall 31 thereof is a pin 33. One end of pin 33 is reduced in diameter at 34 to closely fit in an aperture formed in one end of arm 24 and the pin is secured to the arm to provide electrical unity therebetween by any suitable means such as by welding at 35. The free end of pin 33 preferably carrsies a contact disc 36 of a suitable low electrical resistance material which may be silver soldered or otherwise secured to the pin to insure electrical unity therebetween. When worn, contact disc 36 may be readily replaced by removing what remains of the old disc and securing a new one in its place on the pin.

For a purpose to be seen, pin 33 has an axially extending threaded aperture for receiving a set screw 37, and abutment 119, contact member 27 and contact disc 36 are provided with respective aligned apertures in alignment with the threaded aperture formed in the pin. A plug 38 normally closes the aperture in abutment 119. Abutment 119 and contact member 27 are also provided with aligned apertures 39 in whose one end is threaded a lubrication fitting 40 through which a suitable grease may be forced between respective abutting surfaces provided by contact member 27 and contact disc 36, and annular wall 31 and pin 33. Note that O ring 32 sealably engages pin 33 at a place spaced from its free end to prevent escape of grease from between the aforementioned abutting surfaces and to exclude foreign matter from therebetween.

With but few exceptions, the parts associated with abutment 219 and not previously disclosed are identical with those heretofore described; accordingly, similar parts are identified by the same reference characters but with the prefix 1 added. Since no set screw is carried by pin 133, no aperture is provided in the pin, abutment 219, contact member 127 or contact disc 136. Note that portion 134 of pin 133 is reduced in length so that the aperture in arm 25 into which it projects provides a pocket for receiving a projection 41 carried by a cup-shaped member 42. Interposed between member 42 and arm 25 are insulators 43 for a purpose to appear. Screws 129 and annular shoulder 130, similar to parts 29 and 30, are provided, pin 133 being secured to arm 25 by welding 135.

Stacked within member 42 are a plurality of spring washers 44 which are adapted to be compressed by set screw 37. A disc 45 is interposed between the end of the set screw and the washers to provide a flat surface for abutting the washer nearest screw 37.

It will be understood that by removing plug 38 in abutment 119, access to set screw 37 will be provided whereby the latter may be rotated to compress spring washers 44 to a greater or lesser degree. As the spring washers are compressed, pins 33, 133 will be urged apart into close, low electrical resistance engagement with respective contact members 27, 127. With screw 37 adjusted to exert the proper force urging arms 24, 25 and pins 133, 33 apart, plug 38 will be replaced once again.

Referring now to current conducting member 20 (FIGURES 3 and 5) and more particularly to abutment 120 thereof, this abutment is provided with a rectangular recess 46 in which is seated a rectangular contact member 47 which is held assembled with the abutment by means of gib members 48 (see also FIGURE 4) secured to the abutment in spaced, parallel relation by cap-screws 49. Slidably fitting between gib members 48 is a member 50 having an annular wall 51 which provides a circular recess similar to the one provided by the previously described ring members 28, 128.

Seated in the recess provided by member 50 and rotatably carried by annular wall 51 thereof is a pin 52 which is carried by arm 24 and which is similar in all respects to pin 33 carried by the other end of the arm. As will readily appear, the free end of this pin carries a contact disc 53 which is similar to disc 36 carried by pin 33 and, in a manner similar to the latter, pin 52 has a set screw 54 threaded therein.

Abutment 120 and contact member 47 also have apertures aligned with screw 54 in the position of parts shown in FIGURE 3 to permit adjustment of the screw. As with abutment 119, the aperture aforesaid in abutment 120 is adapted to be closed by a removable plug 55. Also formed in abutment 120 and in contact with member 47 are aligned apertures 56 in whose outer end is threaded a lubrication fitting 57.

Referring once again to the member 50 which provides the recess in which shaft 52 is receivable, this member not only carries an O ring 58 which engages shaft 52 but also carries an O ring 59 which engages contact member 47 and effectuates a seal between the respective adjoining surfaces as of member 50 and contact member 47.

Means are provided for urging member 50 closely against contact member 47 and, in order to reduce friction to a minimum, the following is employed: Arm 24 carries a plurality of plunger members 59, herein shown to be three in number, which engage member 50. Each plunger member 59 has a rotatable ball bearing at one end which engages member 50 and each plunger is slidable in respective bores formed in arm 24. A spring 60 is disposed in each of the aforesaid bores, one end of each spring abutting a plug 61 which closes respective bores and the other end of each spring engaging respective plunger members to urge the latter against member 50 and thus urge member 50 closely against contact member 47.

Abutment 220 is similar to abutment 120 and the parts associated therewith bear the same relationship with the parts associated with abutment 120 as those parts heretofore described carried by abutments 119, 219 of member 19. Accordingly, similar parts associated with abutment 220 are identified by the same reference characters heretofore employed but with the prefix 2 added.

It will be evident that while arms 24, 25 are carried by member 19 for pivotal movement only, the arms are carried by member 20 not only for pivotal movement but also for rectilinear movement in a direction generally longitudinally of the arms. This arrangement permits a good electrical connection to be maintained between members 19, 20 while providing for free, straight line vertical movement of member 19 with slide 13 while member 20 remains stationary.

In view of the foregoing it will be apparent to those skilled in the art that we have accomplished at least the principal object of our invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that our invention is not limited thereto.

We claim:

1. In an electrical device through which relatively high amperage current flows, the combination comprising a pair of spaced-apart, current conducting members shiftable relative to each other and one carrying an annular wall which defines a circular recess, a rigid current conducting arm extending between said members, pin means carried by said arm in electrical unity therewith and projecting transversely thereof for rotatably fitting within said recess and the free terminal end of said pin means providing an electrical contact surface in abutting relation with an electrical contact surface which forms the bottom of said recess, means urging respective electrical contact surfaces of said pin means and said member into low electrical resistance engagement, and means in sealing engagement with both said defining wall and said pin means at a place spaced from the latter's free terminal end to maintain lubricant between said contact surfaces and prevent entrance of foreign matter therebetween.

2. In an electrical device through which relatively high amperage current flows, the combination comprising a pair of spaced-apart, current conducting members shiftable relative to each other and each providing a pair of spaced abutments each of which carries an annular wall which defines a circular recess, a pair of rigid current conducting arms extending between said members and disposed in side by side relation between said pairs of abutments, pin means carried by respective arm portions adjacent said members and in electrical unity therewith and each projecting transversely of its arm in a direction away from the opposite arm, each pin means being rotatably supported by a respective recess defining annular wall and the free terminal end of each pin means providing an electrical contact surface in abutting relation with an electrical contact surface which forms the bottom of a respective recess, means urging respective abutting electrical contact surfaces into low electrical resistance engagement, and means in sealing engagement with both said defining walls and respective pin means supported thereby at a place spaced from each pin means free terminal end to maintain lubricant between said contact surfaces and prevent entrance of foreign matter therebetween.

3. In an electrical device through which relatively high amperage current flows, the combination comprising a pair of spaced-apart, current conducting members shiftable relative to each other and each providing a pair of spaced abutments each of which carries an annular wall which defines a circular recess, a pair of rigid current conducting arms extending between said members and disposed in side by side relation between said pairs of abutments, pin means carried by respective arm portions adjacent said members and in electrical unity therewith and each projecting transversely of its arm in a direction away from the opposite arm, each pin means being rotatably supported by a respective recess defining annular wall and the free terminal end of each pin means providing an electrical contact surface in abutting relation with an electrical contact surface which forms the bottom of a respective recess, resilient means urging respective abutting electrical contact surfaces into low electrical resistance engagement, screw means for varying the urging force exerted by said resilient means, and means in sealing engagement with both said defining walls and respective pin means supported thereby at a place spaced from each pin means' free terminal end to maintain lubricant between said contact surfaces and prevent entrance of foreign matter therebetween.

4. In a resistance welder having a fixed electrode connected to one end of a transformer secondary and a vertically reciprocable electrode adapted to be connected to the opposite end of said transformer, the improvement comprising a connection between said reciprocable electrode and said opposite end whereby a low electrical resistance path for current flow is provided while accommodating for change of spacing between said opposite secondary end and said reciprocable electrode caused by vertical reciprocation of the latter, said connection including a bifurcated conductor member electrically and mechanically connected to each of said opposite transformer end and said reciprocable electrode, the furcations of said members being vertically disposed and facing each other in aligned manner, the furcations of each conductor member carrying socket members which face each other and provide facing axially aligned sockets, a pair of parallel, laterally spaced conductor bars extending between the bifurcated conductor members, each pair of ends of said conductor members having oppositely extending pivot members received in bearing relation in respective sockets, at least the set of socket members on one of said bifurcated conductor members being slidably carried for movement toward and away from the other bifurcated conductor member to provide for the change of spacing aforesaid, retaining cups carried by one of said conductor bars at each of its ends, each retaining cup containing stacked spring washers, and a screw member threaded through the other one of said conductor bars at each of its ends, the screw members bearing against respective spring washers to provide a pressing action on said conductor bars to maintain said pivot members seated in respective sockets.

References Cited in the file of this patent
UNITED STATES PATENTS

| | | |
|---|---|---|
| 1,378,801 | Lamb | May 17, 1921 |
| 1,428,863 | Smith | Sept. 12, 1922 |
| 1,546,501 | Martus | July 21, 1925 |
| 2,239,846 | Gifford | Apr. 29, 1941 |
| 2,274,422 | Mahoney et al. | Feb. 24, 1942 |
| 2,575,409 | Cooper et al. | Nov. 20, 1951 |
| 2,595,011 | Singer | Apr. 29, 1952 |
| 2,600,582 | Sciaky | June 17, 1952 |
| 2,740,039 | Phillips | Mar. 27, 1956 |
| 2,744,989 | Fagge | May 8, 1956 |
| 2,879,374 | Seeloff | Mar. 24, 1959 |
| 2,879,490 | Campbell et al. | Mar. 24, 1959 |